US012601219B2

(12) United States Patent
McGlade

(10) Patent No.: US 12,601,219 B2
(45) Date of Patent: Apr. 14, 2026

(54) FLOOD PROTECTION BARRIER AND A FLOOD PROTECTION BARRIER MONITORING AND CONTROL SYSTEM

(71) Applicant: Patrick McGlade, Ardee (IE)

(72) Inventor: Patrick McGlade, Ardee (IE)

( * ) Notice: Subject to any disclaimer, the term of this patent is extended or adjusted under 35 U.S.C. 154(b) by 71 days.

(21) Appl. No.: 18/928,763

(22) Filed: Oct. 28, 2024

(65) Prior Publication Data

US 2025/0137319 A1     May 1, 2025

(30) Foreign Application Priority Data

Oct. 28, 2023    (GB) ..................................... 2316510

(51) Int. Cl.
| | |
|---|---|
| *E06B 9/04* | (2006.01) |
| *H02K 7/18* | (2006.01) |
| *H02K 11/00* | (2016.01) |
| *E06B 9/00* | (2006.01) |

(52) U.S. Cl.
CPC ............. *E06B 9/04* (2013.01); *H02K 7/1823* (2013.01); *H02K 11/0094* (2013.01); *E06B 2009/007* (2013.01)

(58) Field of Classification Search
CPC ... E06B 9/04; E06B 2009/007; H02K 7/1823; H02K 11/0094
See application file for complete search history.

(56) References Cited

U.S. PATENT DOCUMENTS

| | | | | |
|---|---|---|---|---|
| 5,882,589 | A * | 3/1999 | Mariotti ................. | B08B 3/102 |
| | | | | 422/267 |
| 9,745,795 | B2 | 8/2017 | Su | |
| 2005/0085799 | A1* | 4/2005 | Luria ................... | A61H 31/005 |
| | | | | 606/1 |
| 2010/0174401 | A1 | 7/2010 | Giacosa et al. | |
| 2017/0058589 | A1* | 3/2017 | Williams ................. | E06B 9/02 |
| 2020/0156253 | A1* | 5/2020 | Li .......................... | B25J 9/0084 |

FOREIGN PATENT DOCUMENTS

| | | |
|---|---|---|
| EP | 2607601 A1 | 6/2013 |
| EP | 3599337 B1 | 4/2022 |

OTHER PUBLICATIONS

European Search report in Application GB 2316510.3 dated Oct. 28, 2024.

* cited by examiner

*Primary Examiner* — Kyle Armstrong
(74) *Attorney, Agent, or Firm* — Panitch Schwarze Belisario & Nadel LLP

(57) ABSTRACT

A flood protection barrier for use in an entrance to a property includes a body panel having an edge for engaging a portion of the entrance, an extension panel extending from the body panel and an inflatable seal extending around portions of the body panel and the extension panel that engage the entrance. An inflatable seal for forming a seal between the flood protection barrier and the entrance when the flood protection barriers is in use. An inflation mechanism for inflating the seal with a fluid. A pressure sensor for sensing a pressure of the fluid in the inflated seal and generating pressure data and a data transmitter for periodically transmitting the pressure data to a remote receiver associated with an alarm system for alerting a user to a drop in pressure in the inflatable seal below a predetermined level.

22 Claims, 15 Drawing Sheets

24

2/4-1

2/4-2

200

A

212

224

222

216

226

250

216

B

216

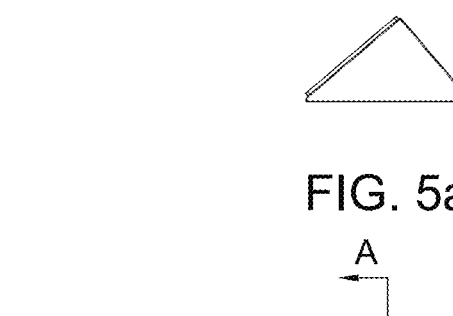
FIG. 5a
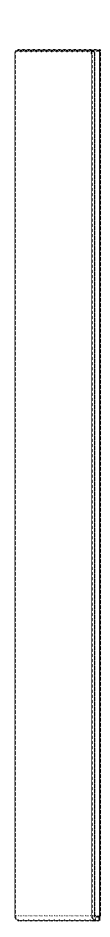
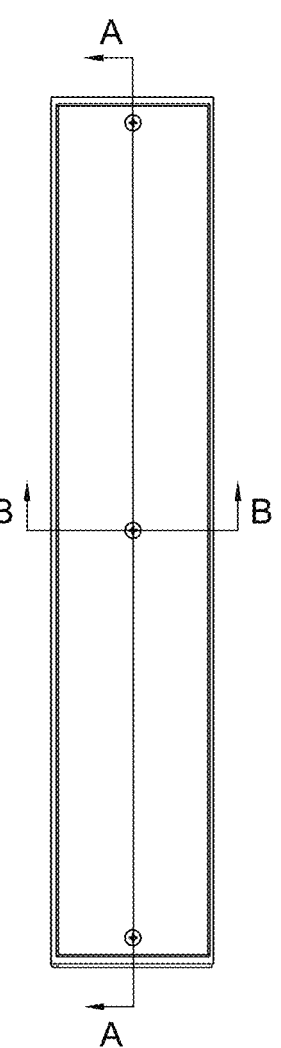
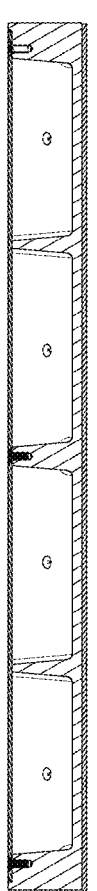
FIG. 5b       FIG. 5c       FIG. 5d
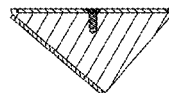
FIG. 5e

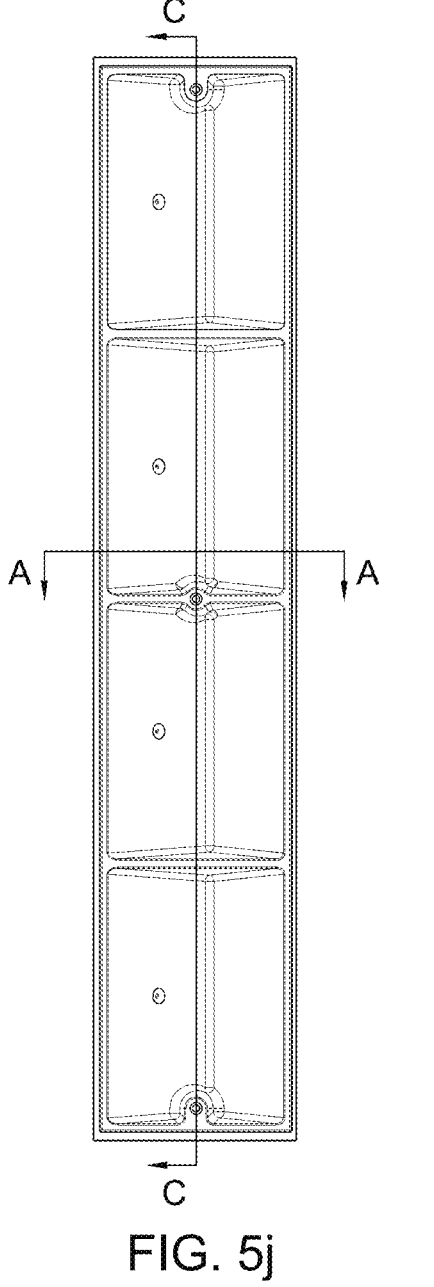
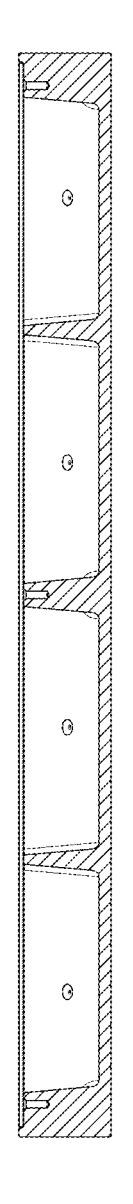
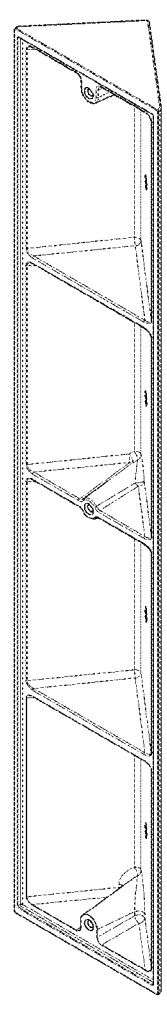
FIG. 5j
FIG. 5k
FIG. 5l
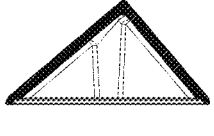
FIG. 5m

```
// Example JSON packet
String createJsonPacket (float pressure, float temperature, float lat, float lng,
    float batteryVoltage, float pitch, float roll, String uniqueID)  {
    String jsonPacket = "{";
    jsonPacket += "\"pressure\":" + String(pressure) + ",";
    jsonPacket += "\"temperature\":" + String(temperature) + ",";
    jsonPacket += "\"gps\":{\"lat\":" + String(lat) + ",\"lng\":" + String(lng) + "},";
    jsonPacket += "\"battery_voltage\":" + String(batteryVoltage) + ",";
    jsonPacket += "\"angle\":{\"pitch\":" + String(pitch) + ",\"roll\":" + String(roll) + "},";
    jsonPacket += "\"id\":\"" + uniqueID + "\"";
    jsonPacket += "}";
    return jsonPacket;
```

FIG. 10

FLOOD PROTECTION BARRIER AND A FLOOD PROTECTION BARRIER MONITORING AND CONTROL SYSTEM

CROSS-REFERENCE TO RELATED APPLICATIONS

This application claims priority under 35 U.S.C. § 119 (b) to Great Britain Patent Application No. 2316510.3, filed Oct. 28, 2023, the disclosure of which is incorporated herein by reference in its entirety.

The present invention relates to a flood protection barrier and monitoring system for use in an entrance to a property for example, a doorway and relates particularly, but not exclusively, to a flood protection barrier for use on domestic properties.

The primary purpose of flood protection barriers is to prevent floodwaters from entering a building or space through entrance points or doorways during heavy rains or a storm surge. Commonly used in domestic, commercial and industrial settings these flood barriers help to protect assets and personal belongings along with preventing damage to the interior structure of the building from rising floodwaters.

With the increasing frequency of severe weather events and flooding due to climate change, flood barriers have become indispensable for home and business owners in high flood risk areas. Flooding can have devastating consequences for both homes and businesses, causing extensive and costly damage. In homes, floodwaters can infiltrate living spaces and saturate floors and walls, leading to structural deterioration. In businesses, the impact can cause widespread disruption to operations, damage to expensive equipment, leading to costly repairs and downtime.

Once a property or business has been proven to be located within an area prone to flooding, the value of the property can fall along with large increases in insurance policies. Furthermore, flooding events can vary from very short term flash floods to longer term flooding where raised water levels can be present for a long time. In the latter case, it is important that any barriers used are regularly monitored to ensure that they are successfully preventing water from entering a property. However, such monitoring of barriers during a flood event can be dangerous.

An example of a barrier of the prior art is disclosed in the Applicant's earlier patent specification No. EP2607601.

Herein, we will refer to a doorway by way of example of an entrance to a property but it is to be understood that the flood protection barrier of the present invention can be used at any entrance to a property where flood waters could enter the property.

Preferred embodiments of the present invention seek to overcome or alleviate the above described disadvantages of the prior art.

SUMMARY OF THE INVENTION

According to a first aspect of the present invention there is provided a flood protection barrier for use in an entrance to a property, for example, a doorway, the flood protection barrier comprising:

a body panel having at least one edge for engaging a portion of an entrance to a property;

at least one extension panel extending from said body panel and having at least one edge for engaging another portion of said entrance;

at least one inflatable seal extending around said portions of said body panel and said extension panel that engage the entrance;

at least one inflation device for inflating said inflatable seal with a fluid to provide, in use, an inflated seal for sealing the flood protection barrier in the entrance;

at least one pressure sensor for sensing a pressure of said fluid in said inflated seal and for generating pressure data; and at least one data transmitter for periodically transmitting said pressure data to a remote receiver having an associated alarm system for alerting a user to a drop in pressure in said inflatable seal below a predetermined pressure level.

Preferably, the fluid comprises a gas and more preferably, the gas may comprise a combination of gases, wherein most preferably, the gas comprise air. However, the gas may also comprise a gas such as carbon dioxide.

The flood protection barrier of the present invention comprising a transmitter, which transmits data regarding the pressure of the inflatable seal, offers several advantages. By transmitting the pressure of the seal, the user will be made aware of a risk that the flood barrier is at risk of allowing water into the premises/building if there is a decrease in pressure in the inflated seal indicating that the seal is beginning to deflate. The user can, therefore, take prompt action and reinflate the seal, reinforcing the barrier between the building and the flood waters before any flood related damage could occur.

When a building has multiple entrances, the user will have to provide a flood protection barrier at each entrance which would require installing multiple flood barriers at times of risk from flooding or during a flood. The transmitter will be able to provide real-time updates on the pressure status of all the flood protection barriers of the present invention, while in operation. Thus, eliminating the need for the user to periodically inspect each barrier and ensure that the pressure remains at the required level. Furthermore, in the event that a user needs to evacuate a building equipped with flood protection barriers, they can do so without the necessity of returning to the site or navigating through potentially hazardous conditions. Additionally, the inclusion of the transmitter simplifies the continuing management of flood protection but also ensures that user can exit the flooded area and move to safety.

In addition, the real-time pressure monitoring system and transmitter offers a secondary benefit of maintaining a comprehensive log of the usage of each respective flood protection barrier. This log of data provides users with a historical record of when the flood barriers have been deployed. By having a detailed log, the user can supply data including when the barriers were deployed in a house or business during a flood. This data may be required for example, by an insurance company. The data would be used to verify that a property owner or business had invested in a flood barrier protective device and that it was used during a particular storm or flood. This verification could benefit the user by gaining a potential reduction in their insurance costs.

Moreover, in a situation where two barriers are required side by side to cover for a large entrance, for example a doorway, there is a risk that one could begin to deflate. If this occurred both barriers would become unstable and potentially topple over. However, an advantage of the present invention is the inclusion of a transmitter for transmitting the pressure data of both barriers, the user will be able to detect, and to be alerted to, any significant pressure changes in the seals of each of the flood protection barriers. This would allow the user to identify when or if one of the barriers is on the verge of deflating, enabling them to take preventive measures and address the issue promptly.

In a preferred embodiment, the flood protection barrier further comprises at least one electricity generator for generating electricity from the action of said inflation device and at least one battery for storing said electricity for powering said pressure sensor and transmitter.

By using an electricity generator this eliminates the need for an external power supply. During a flood, power to a building or house may not be available, therefore having an internal power generator always ensures a source of electricity. Fortunately, for the majority of properties, flooding events are rare and therefore the need to use flood protection barriers is infrequent. However, the operation of a sensor and transmitter requires a source of electrical power and there is a significant risk that a battery and a flood barrier that has not been used for some years may not have sufficient charge to operate the sensor and transmission through the whole of the duration of a flood event. Since it is necessary to put energy into the barrier as part of the installation, in particular the inflation of the seal, some of this energy can be diverted to generate electrical power to charge a battery thereby ensuring a consistent source of power for the sensor and transmitter during the flood event.

In another preferred embodiment the electricity is generated by an air turbine pneumatically connected to said pump.

In an additional preferred embodiment, the inflation device comprises a hand-operated pump.

As the seal is being inflated, and where a hand-operated pump is being used, this provides a simple source of battery charging energy.

In a further preferred embodiment, the electricity is generated by a dynamo connected to a reciprocating member of said hand-operated pump.

In a preferred embodiment the flood protection barrier further comprises a pair of extension panels extending in opposite directions from said body panel.

In another preferred embodiment the data transmitter transmits and logs a date and a time when said barrier is in use.

In a further preferred embodiment, further comprising an app downloadable onto a device wherein said data transmitter transits to said device and said data is stored on said app.

Flood Protection Barrier Monitoring and Control System

In a further aspect of the present invention, there is also provided a monitoring and control system for a flood protection barrier, and more particularly, to a system for continuously monitoring air pressure, temperature, barrier angle, and battery life, and transmitting this data to a remote cloud-based platform for real-time monitoring and alerts.

The present invention accordingly provides a system for monitoring and controlling a flood protection gate using a series of sensors to detect critical operational parameters, including air pressure, temperature, barrier alignment, and battery status. The system utilizes a low-power microcontroller unit (MCU) to collect data from the sensors and transmit it periodically to a cloud-based monitoring platform via a GSM/GPRS module. The system is capable of operating in a low-power sleep mode, waking periodically to collect and transmit data, thereby conserving battery life.

The flood protection barrier monitoring and control system is configured for installation in residential and commercial properties to protect against flooding. The system features an inflatable seal around the flood barrier, which ensures a watertight seal in use, by forming a sealing surface between the inflatable seal and the walls defining the mouth of an entrance to the property and by preventing water from seeping into the property. An intelligent monitoring system continuously tracks the pressure within the seal. If the pressure falls below a predetermined threshold, an alert is sent to the user. The user may be a property owner or property care-taker for instance and who may reside at a remote location.

The flood barrier monitoring and control system of the present invention uses GPS and GPRS technology to capture and transmit various environmental and positional data to a cloud-based platform. This data includes real-time readings of the seal pressure, barrier temperature, and precise GPS coordinates. The system also measures the barrier's angle to verify that it remains in an optimal vertical position. Data packets are transmitted periodically to the cloud, where they are stored and monitored for potential issues.

The flood barrier monitoring and control system of the present invention is powered by a series of specialized modules, including the ESP32 for Wi-Fi and Bluetooth connectivity, the Quectel M65 GSM/GPRS module for data transmission, and a pressure sensor capable of measuring up to 6 bars. An accelerometer and gyroscope ensure accurate positioning, while a GPS module provides precise location data. Additionally, a dynamo charging interface supports the power management module, allowing the system to operate sustainably.

The integrated flood protection barrier monitoring and control system enhances the reliability of the flood barrier, ensuring that any issues are detected and communicated promptly, thereby maximizing the effectiveness of flood prevention, particularly useful in vulnerable geographical locations that are prone to flooding.

The present invention is further characterized by the use of an adaptive alerting mechanism that allows users to set customized thresholds for various parameters, such as air pressure and battery capacity. When these thresholds are breached, the system is configured to send notifications through the cloud platform, enabling remote monitoring and maintenance of the gate.

Pressure Monitoring: In a preferred embodiment, the flood barrier monitoring and control system of the present invention comprises a pressure sensor with a range of 0-6 bar, connected to the analog input of the microcontroller unit (MCU). This sensor measures the air pressure used to inflate the gate's sidewalls, which form the seal against the door frame. Pressure data is periodically logged and transmitted to the cloud-based platform. If the pressure falls below a user-defined pre-determined threshold (e.g., 2.0 bar), the system sends an alert for notification to the user.

Preferred embodiments of the present invention will now be described, by way of example only, and not in any limitative sense with reference to the accompanying drawings in which.

Figures 3A, 3B:
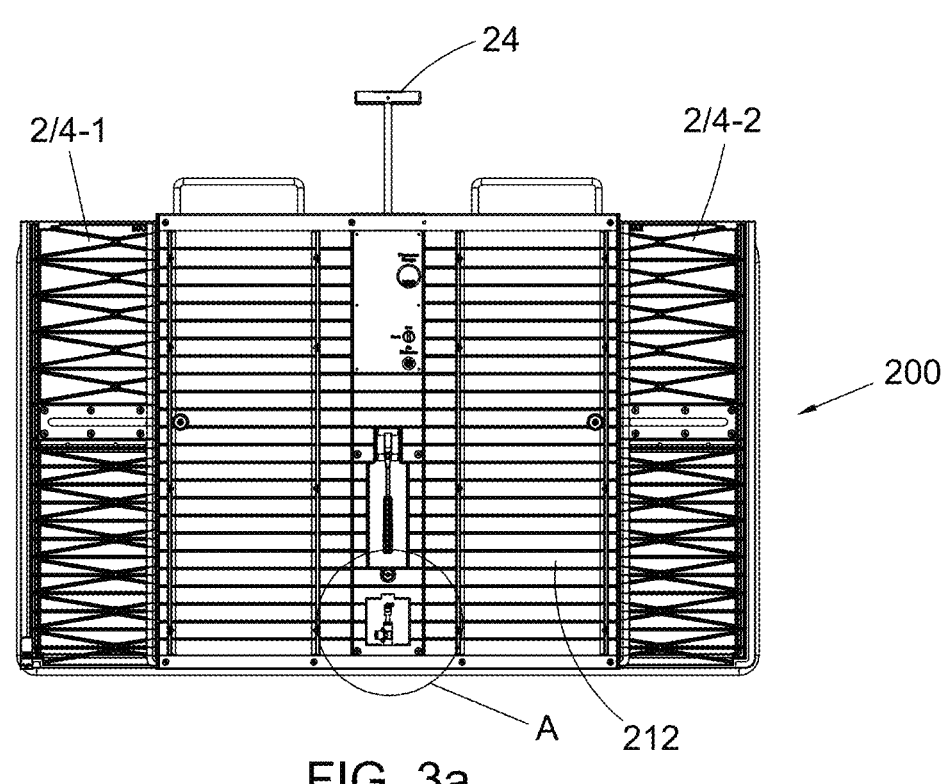
Figures 3C, 3D:
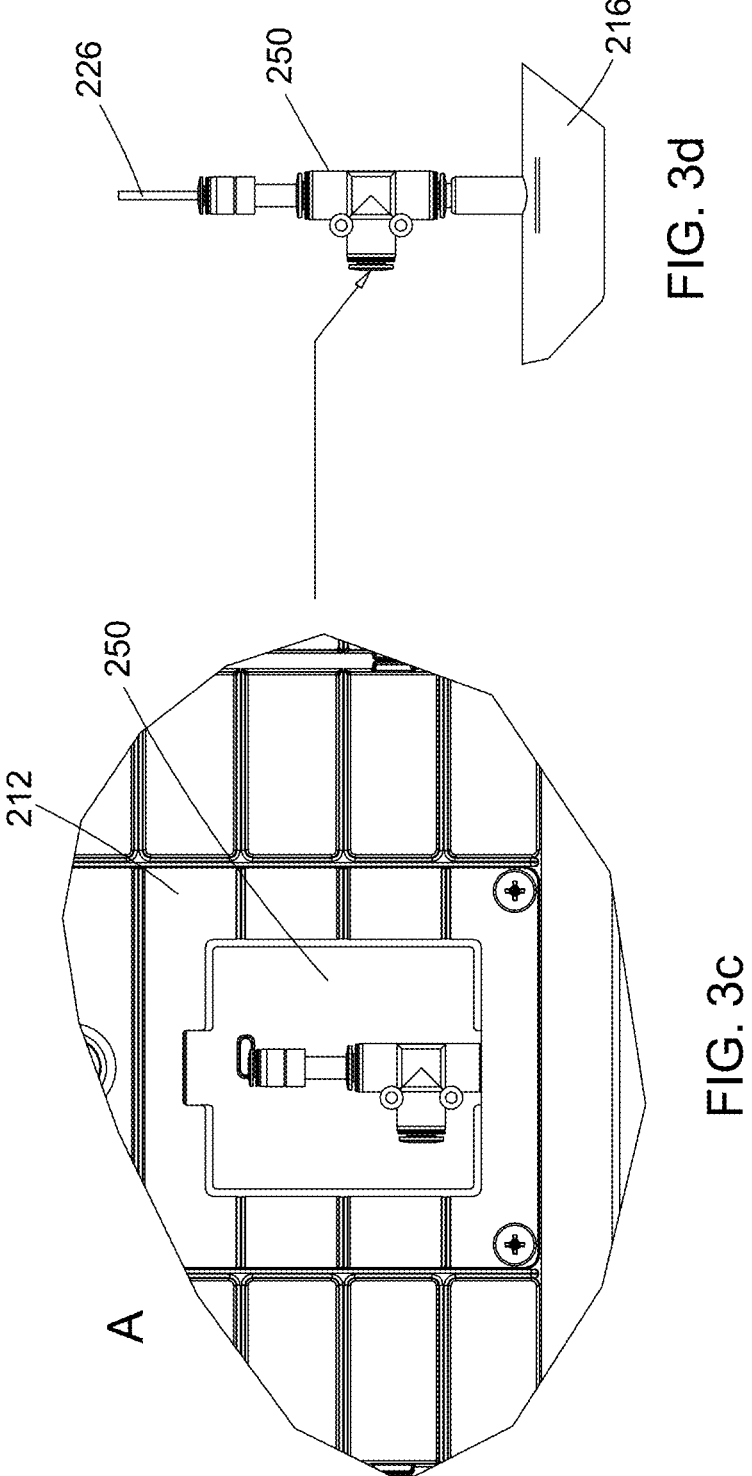

FIGS. 3a, 3b, 3c and 3d are respective views of a tube connector, generally in the form of a T-connector which is adapted to provide an additional air connection for inflating the inflatable seal of the flood protection barrier of the present invention. In this aspect of the present invention, the tube T-connector has the advantage of providing an effective back-up option that allows a user to use a standard known pump to inflate the inflatable seal in the event that the primary hand-operated pump or pumping system that is integrally formed in the flood protection barrier fails. This back-up feature of providing an additional air-connection for inflating the inflatable seal ensures that the flood protection barrier can continue to function without waiting for replacement parts for instance while still being able to maintain the seal formed between the flood protection barrier and the wall areas defining an entrance. Therefore, the flood protection barrier can continue to maintain a seal and be functional to protect the property from potential flooding;

FIG. 3*a* is a rear view of the flood protection barrier with the access panel removed so that the components are visible;

FIG. 3*b* is a sectional view of the tube and pump;

FIG. 3*c* is an exploded view of the feature shown encircled in circle A in FIG. 3*a;*

FIG. 3*d* is an exploded view of the feature shown encircled in circle B in FIG. 3*b;*

Figures 4A, 4B, 4C, 4D, 4E, 4F, 4G:
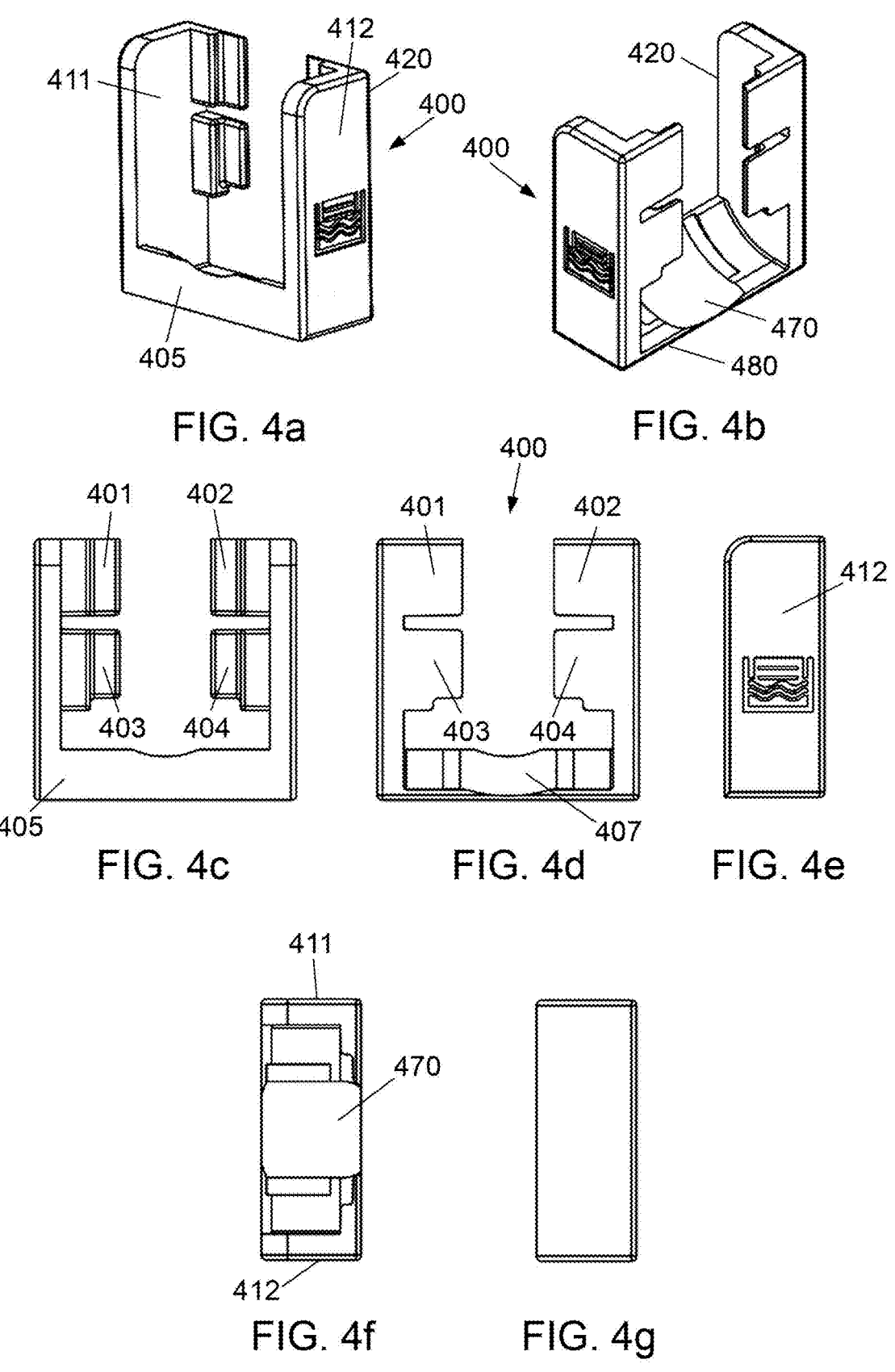

FIGS. 4*a*, 4*b*, 4*c*-4*g* are respective view of another aspect of the present invention comprising a corner adaptor/corner piece that can be used in a preferred embodiment of the invention; the corner adaptor is adapted to be used as an additional seal at ground level at an entrance, where such additional sealing component is desirable to form a seal between the inflatable seal of the flood protection barrier and the surrounding wall and floor elements of the entrance. The improved flood protection barrier of the present invention, in one embodiment also provides, a corner adaptor/corner piece that is preferably, formed of silicone rubber. The corner adaptor/corner piece is adapted to be attachable and engageable with a corner region of the flood protection barrier and can be easily attached or removed from the flood protection barrier, thereby solving the problem of users potentially misapplying or omitting additional sealing components that can be used to provide an additional seal for added seal formation at the floor-level corner regions of an entrance to a property;

FIG. 4*a* is a perspective view from one side of the corner adaptor or corner piece adapted for engaging with the flood protection barrier at the ground level corners of the flood protection barrier;

FIG. 4*b* is a perspective view from another side of the corner adaptor or corner piece adapted for engaging with the flood protection barrier at the ground level corners of the flood protection barrier;

FIG. 4*c* is a front view of the corner adaptor shown in FIGS. 4*a* and 4*b;*

FIG. 4*d* is a rear view of the corner adaptor shown in FIGS. 4*a* and 4*b* and 4*c;*

FIG. 4*e* is a side view of the corner adaptor shown in FIGS. 4*a* and 4*b* and 4*c* and 4*e;*

FIG. 4*f* is a plan view of the corner adaptor from above; and

Figures 5F, 5G, 5H, 5I:
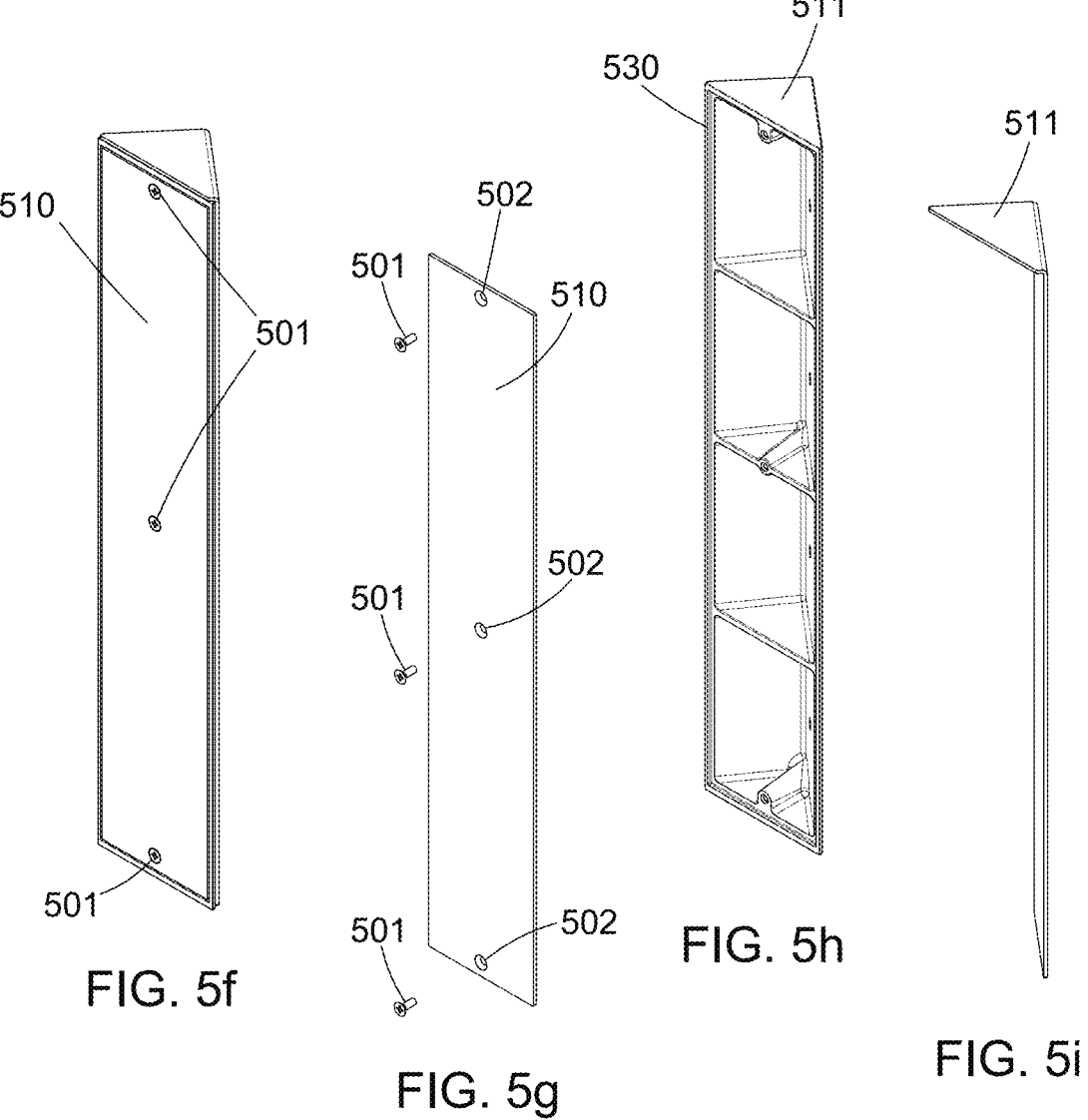
Figures 5N, 5O:
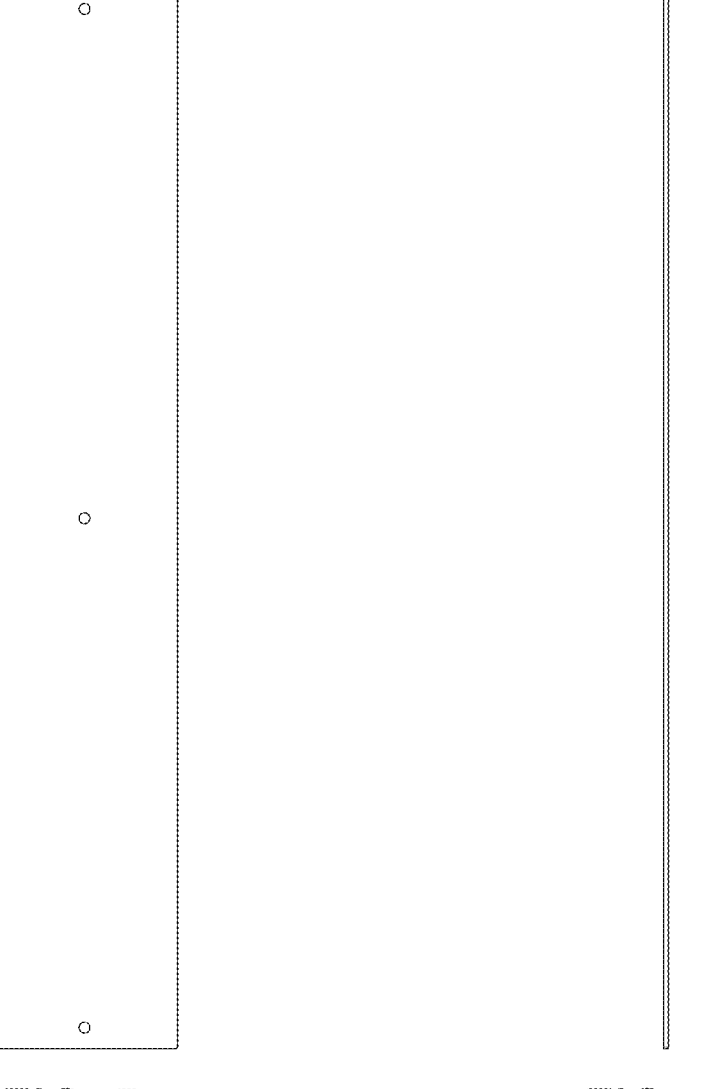
Figures 5P, 5Q, 5R:
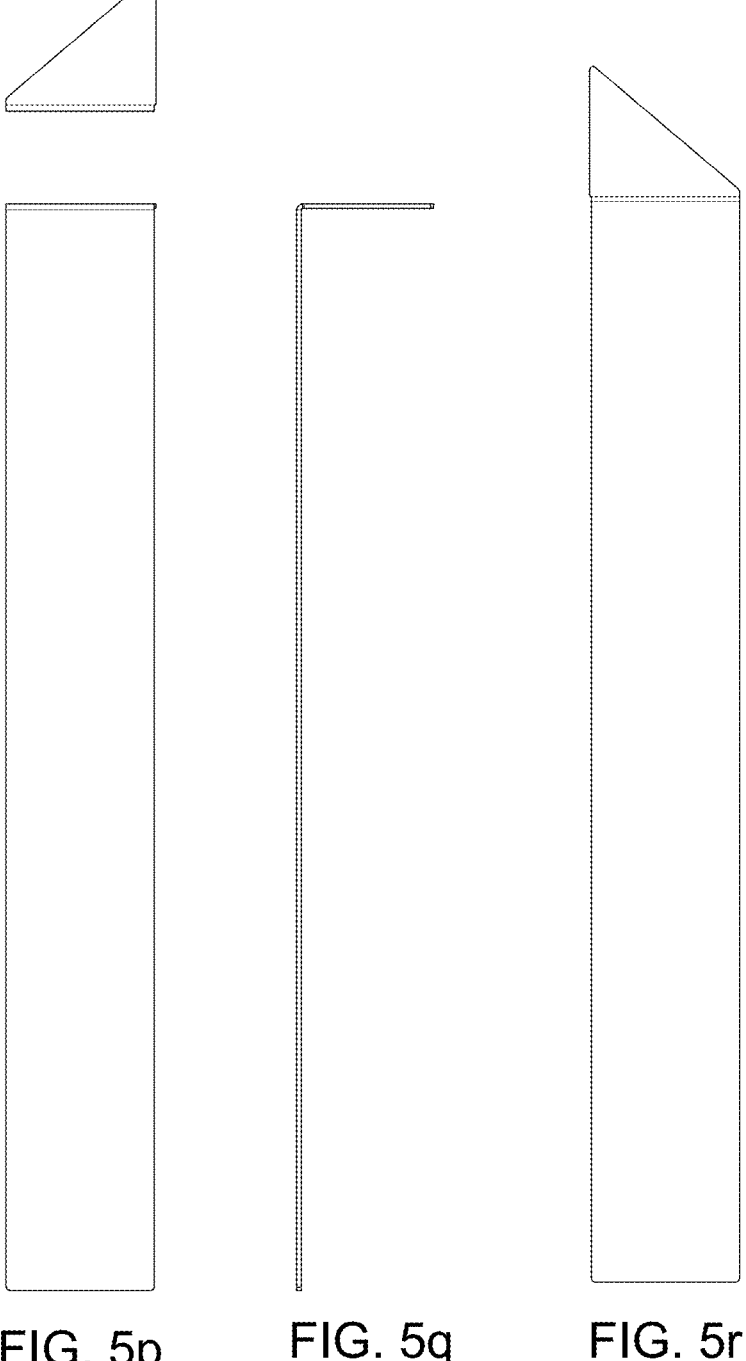

FIG. 4*g* is a plan view from underneath the corner adaptor;

FIGS. 5*a* to 5*r* are views of a wall bracket for use with the flood protection barrier of the present invention; in particular, FIGS. 5*a* to 5*r* are respective view of a wall bracket ("dam jam" bracket) for forming a smooth surface at the surrounding walls of a entrance against which the inflatable seal can abut in order to form a sealing surface between the flood protection barrier and the walls of an entrance;

FIG. 5*a* is a plan view of the wall bracket including cover plate and casting and bracket gasket;

FIG. 5*b* is a side view of the wall bracket;

FIG. 5*c* is a front view of the wall bracket;

FIG. 5*d* is side sectional view of the wall bracket along the line A-A of FIG. 5*c;*

FIG. 5*e* is a sectional view of the wall bracket along the line B-B of FIG. 5*c;*

FIG. 5*f* is a further view of the wall bracket;

FIG. 5*g* is a further view of the wall bracket;

FIG. 5*h* is a further view of the wall bracket;

FIG. 5*i* is a further view of the wall bracket;

FIG. 5*k* is a sectional view of the wall bracket along the line C-C of FIG. 5*j;*

FIG. 5*l* is a further view of the wall bracket;

FIG. 5*m* is a sectional view of the wall bracket along the line A-A of FIG. 5*j;*

Figure 6:
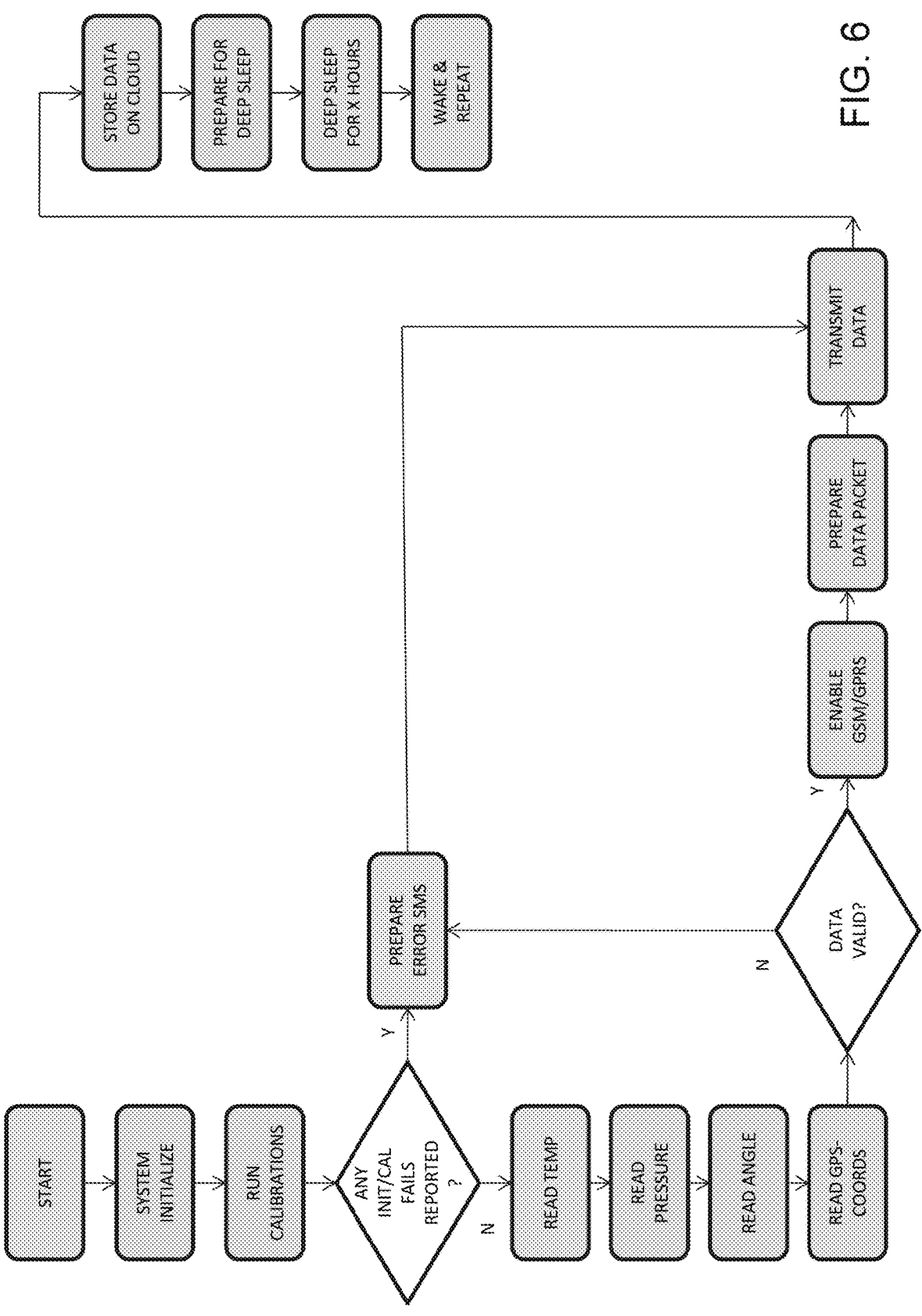
Figure 7:
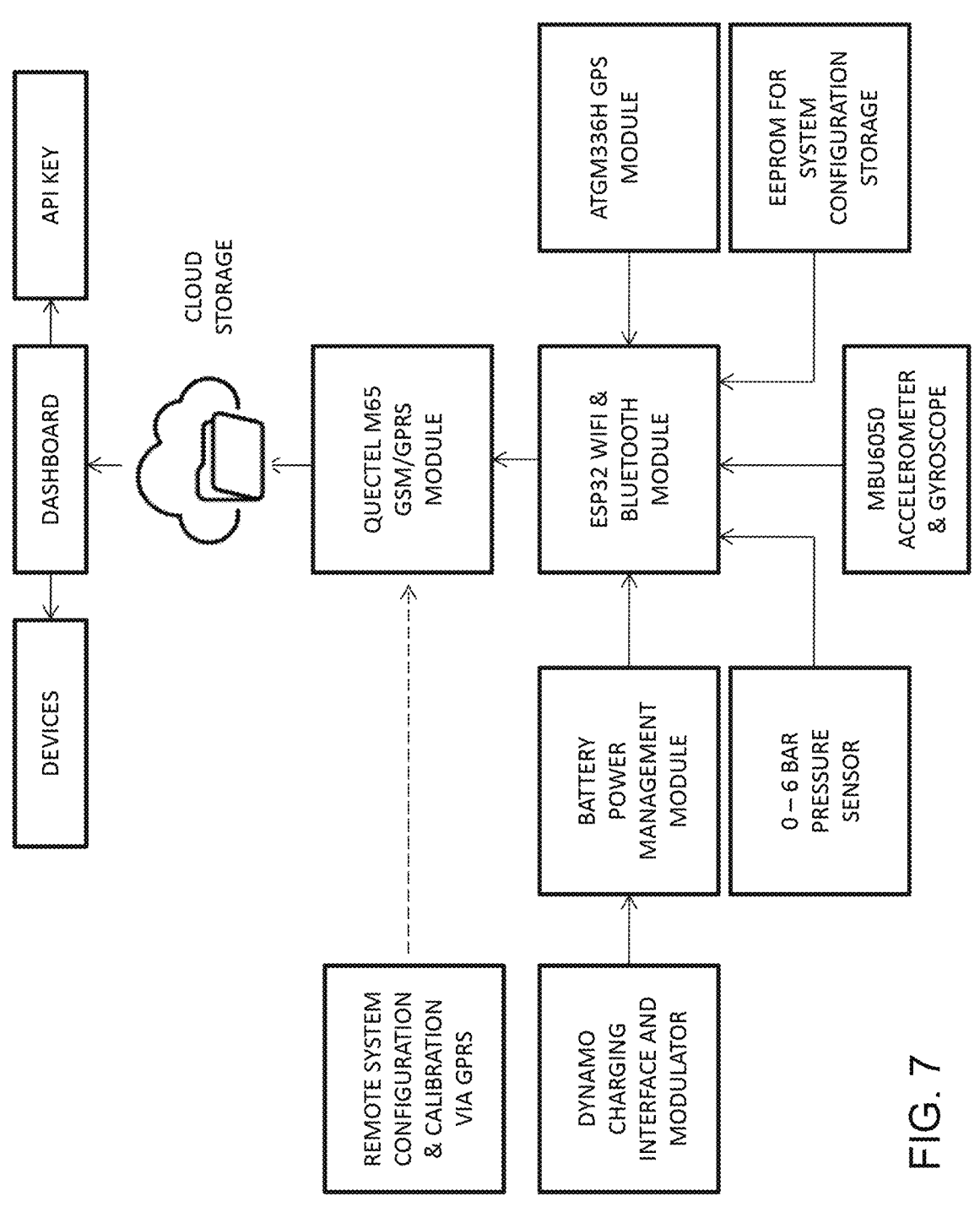
Figure 8:
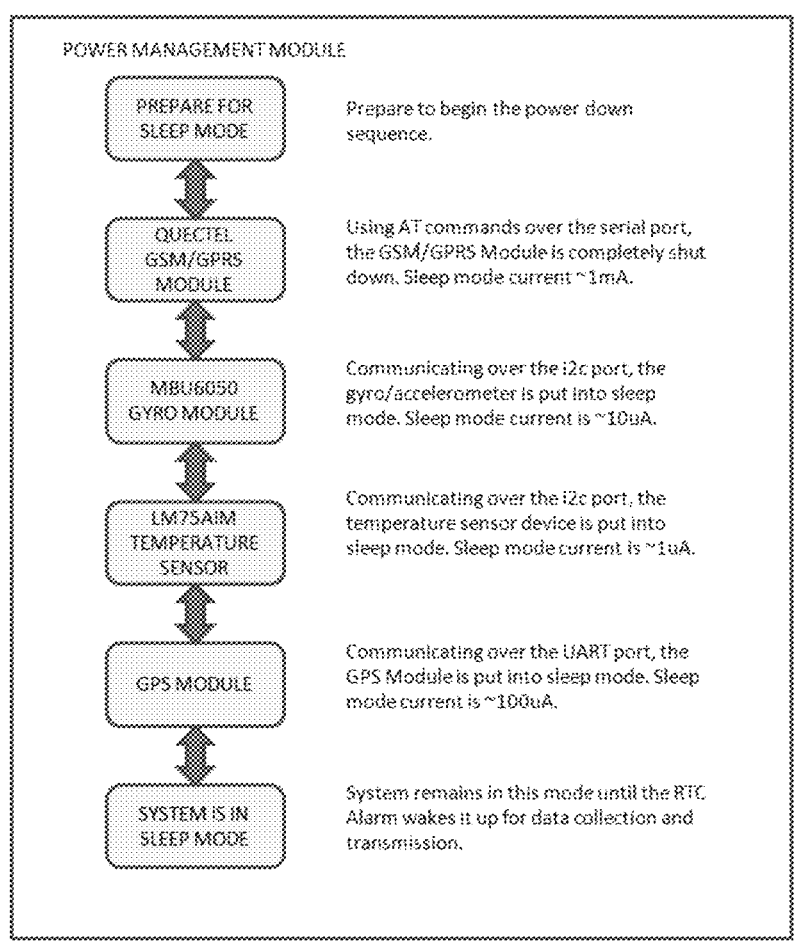
Figure 9:
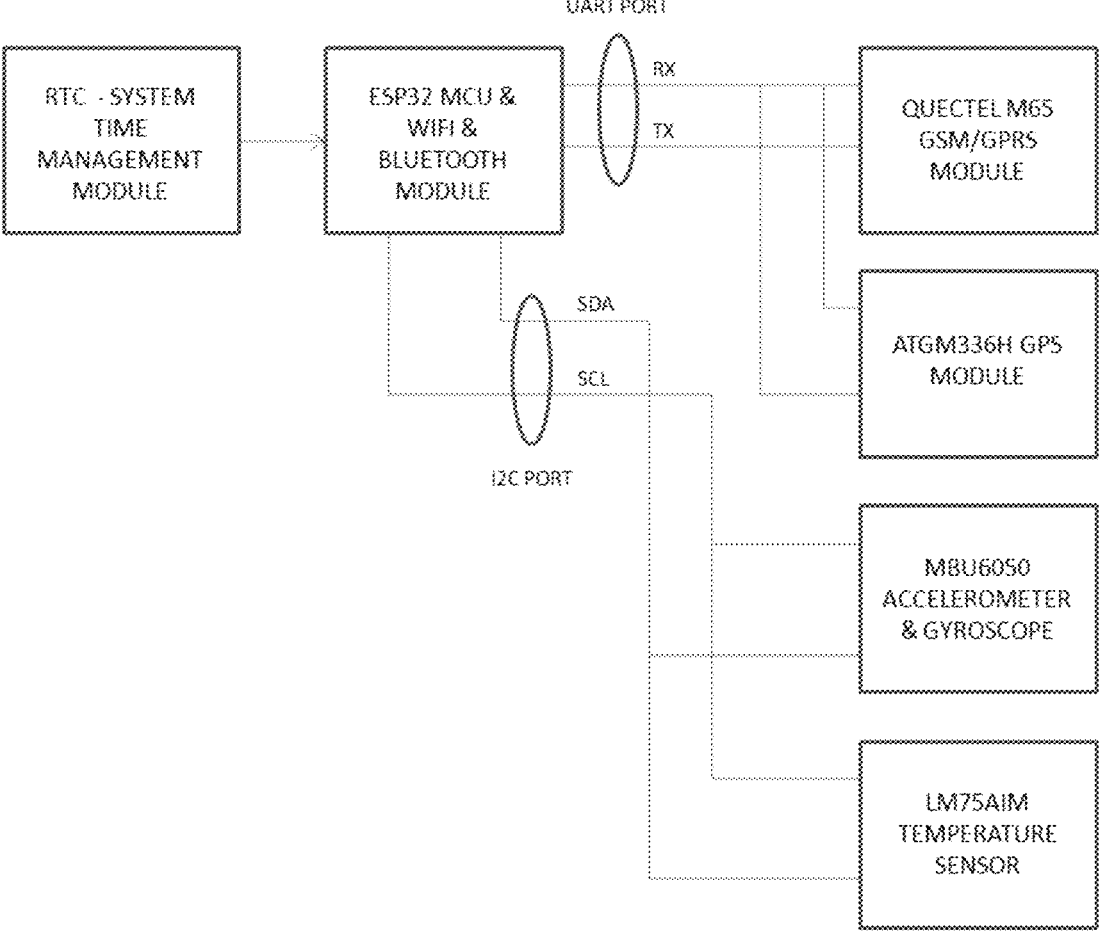

FIG. 5*n* is further view of the wall bracket;

FIG. 5*o* is a further view of the wall bracket;

FIG. 5*p* is a further view of the wall bracket;

FIG. 5*q* is a further view of the wall bracket;

FIG. 5*r* is a further view of the wall bracket;

FIG. 6 is a schematic diagram of the overall flood gate monitoring system, illustrating the key components and their interactions; and showing the power management methodology and wake-sleep cycle of the system;

FIG. 7 is a schematic diagram showing an Example of a data transmission process from the gate system to the cloud platform;

FIG. 8 is a flow chart of the Power Management Sequence;

FIG. 9 is a schematic diagram of the System Configuration & Communications; and FIG. 10 is an example of a data transmission process from the gate system to the cloud platform.

A number of embodiments of the flood protection barrier and the flood protection barrier monitoring and control system will be described with reference to the drawings. Like numerals will be used to refer to like features in the following description of the respective embodiments.

Figure 1:
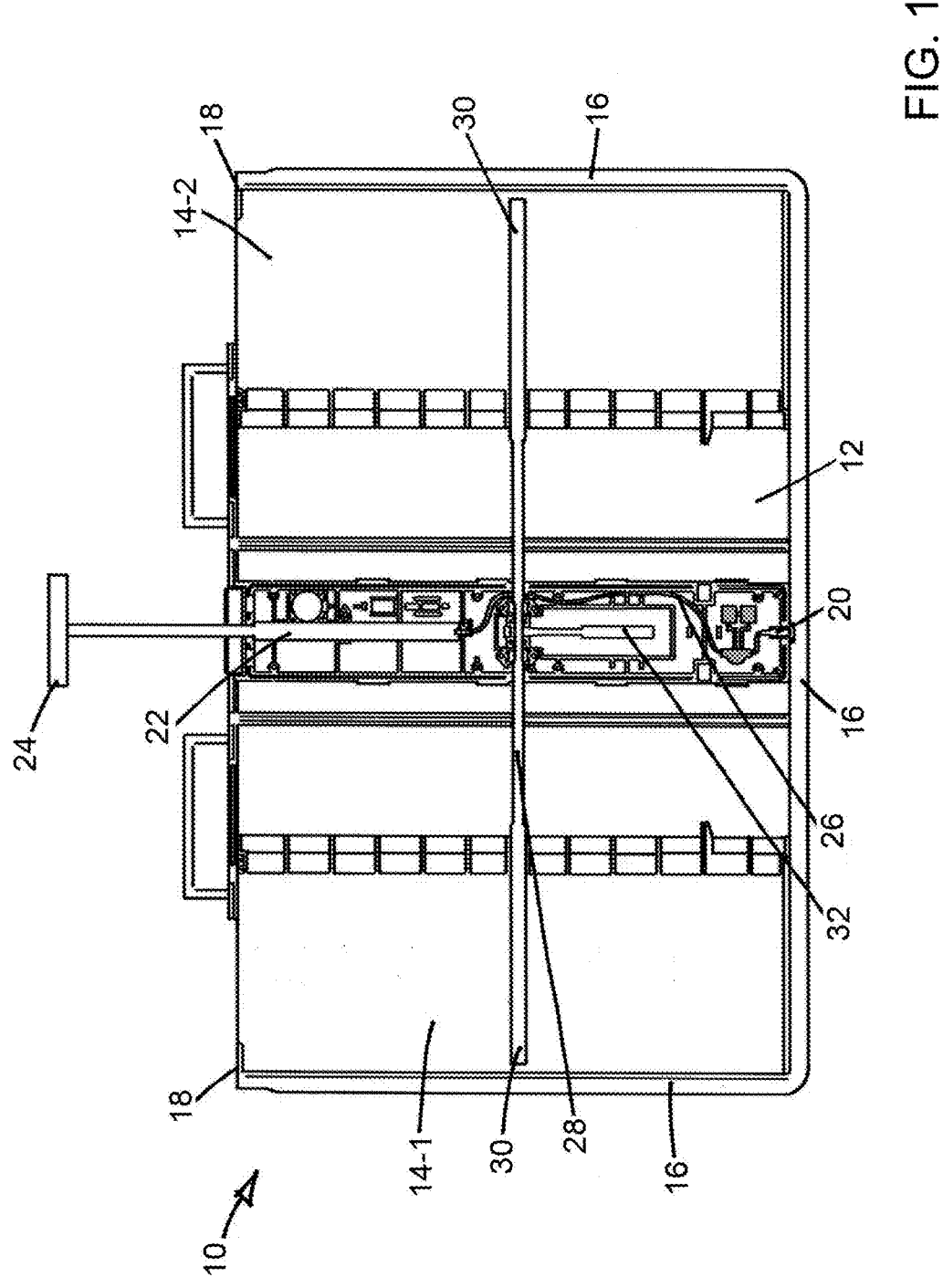
FIG. 1 is a sectional view of a flood protection barrier in a first aspect of the present invention.

Referring initially to FIG. 1, a flood barrier 10 is provided for use in an entrance for example, a doorway and the like. The barrier has a main body panel 12 having at least one edge for engaging a portion of a doorway. The barrier also has a pair of extension panels 14 extending from the main body 12. These extension panels 14 also have edges which engage portions of the doorway. The extension panels 14 retract into the main body panel 12 and are moveable outwards to expand the barrier to fill the space of the doorway. A normal arrangement of the flood barrier in a doorway results in the bottom edge of the main body panel 12 engaging a central portion of the threshold of the doorway. Parts of the bottom edge of the two extension panels 14 also engage the threshold of the doorway. Between the bottom edges of the main body panel and the extension panels the whole of the threshold of the doorway is covered. The extension portions also engage the sides of the doorway up to the height of the extension panels, which is typically around 1 m.

An inflatable seal 16 extends around the portions of the main body panel 12 and extension portions 14 that engage the doorway, as described above. The inflatable seal 16 is formed from an elasticated material in the form of a tube which is sealed at both ends and attaches to the extension portions 14 with clips, not shown but whose location is indicated with reference numeral 18. The seal 16 includes a valve 20 which receives air and retains it within the seal. An example of a suitable material for forming the seal 16 and valve 20 is a bicycle inner tube which is cut and sealed at either end. A pump 22 with a handle 24 is built into the main body panel 12 and is pneumatically connected to the seal 16 via the valve 20. The pump 22 is of a type known as a stirrup pump which is commonly used to inflate bicycle tyres.

Vertical reciprocal movement of the handle 24 pushes air into the seal 16 via a connecting tube 26.

The expanding movement of the extension panels 14 is controlled by a ratchet mechanism working in conjunction with threaded members to push out and retract the extension panels from the main body panel 12. An elongate externally threaded bar 28 is located in the main body panel 12 and is attached to a pair of internally threaded members 30 which are located in the extension panels 14. A ratchet handle 32 is fixed to the threaded bar 28 so as to selectively rotate the bar so that the internally threaded members 30 can move towards or away from the ratchet handle 32. Because the extension panels 14 are fixed to the internally threaded members 30, the movement of the ratchet handle 32 result in the expansion and retraction of the extension panels 14 into and out of the main panel 12.

Figure 2:
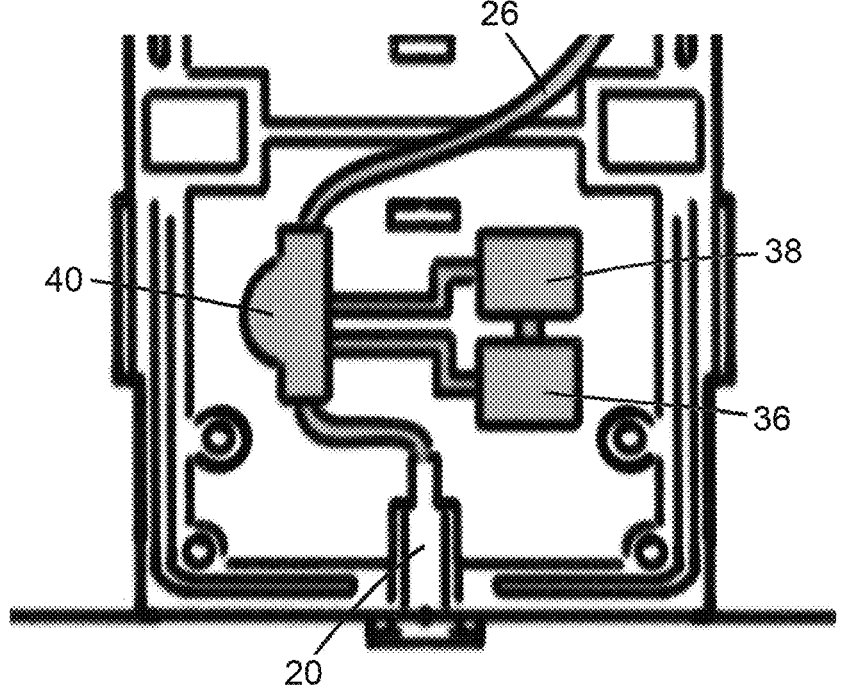
FIG. 2 is a close up of a portion of the flood protection barrier of FIG. 1.

With further reference to FIG. 2, a pressure sensor (not shown) is included to detect and measure the pressure of the air in the seal 16. The sensor is connected to a PCB 36 which includes a processor for processing the data received from the sensor, storage for storing that data and a transmitter for transmitting the data. The PCB is powered by a battery 38. The transmitter is any suitable data transmitting device for transferring the data to a server by any suitable wireless transmission means. In order to minimise battery usage, the transmitter only transmits data periodically, for example, data may only be transmitted once every minute. Alternatively, data may be transmitted at regular intermittent periods while the measurement from the sensor remain substantially the same. However, additional data transmission may occur in the event of a significant change in pressure.

The pressure data is received by a server which processes the data for each barrier and communicates an output to an alarm system that is readable by the user. For example, the alarm system may be an application running on a computer device such as a mobile telephone device which allows a user to monitor the pressure in the or each flood barrier they have installed on a building. The application may include the additional functionality of generating an alarm signal in the event that the pressure in the seal of any barrier drops below a predetermined pressure. As a result, a user is able to remotely monitor the function of the or each flood barrier they have installed without the need for direct visual inspection of the barrier itself.

It is generally the case that flood barriers are used infrequently and it is therefore important to ensure that the battery contains sufficient charge to operate the sensor, PCB and transmitter for the duration of the flood event. An electricity generator, in the form of an air turbine 40 is provided in the connecting tube 26 between the pump 22 and the seal 16. When air is being pumped from the pump 22 and is passing into the seal 16 it passes through the air turbine 40 which generates a current of electricity which is used to charge the battery 38. As a result, even if the flood barrier has not been used for a long period of time, the installation of the barrier results in the charging of the battery during the inflation of the seal. In order to ensure that the battery contains sufficient charge, the flood barrier may be provided with an air line bypass which enables additional air to be pumped from the pump 22 through the air turbine 40 without air passing into the seal 16 and risking over-inflation of the seal to a pressure which would risk damaging the seal. This process can also be used later to add further charge to the battery 38 in the event that the flood event continues and the battery begins to become discharged.

Alternative or Secondary Inflation Means for Inflating the Inflatable Seal ("Tube Tee or Tube T-Connector")

Referring now to FIGS. 3a, 3b, 3c and 3d, there is shown an alternative embodiment of the flood protection barrier which is indicated generally by reference numeral 200. The flood protection barrier 200 comprises a secondary inflation means for inflating the inflatable seal. The secondary inflation means comprises a tube T-connector which is indicated generally by reference numeral 250 and the tube T-connector is adapted to provide an additional air connection for inflating the inflatable seal of the flood protection barrier of the present invention. In this aspect of the present invention, the tube T-connector 250 has the advantage of providing an effective back-up option that allows a user to use a standard known pump indicated by reference numeral 222 (including handle 224) to inflate the inflatable seal in the event that the primary hand-operated pump 24 or pumping system 24 that is integrally formed in the flood protection barrier 200 fails. This back-up feature of providing an additional air-connection means by the connector 250 for inflating the inflatable seal ensures that the flood protection barrier can continue to function without waiting for replacement parts for instance while still being able to maintain the seal formed between the flood protection barrier and the wall areas defining an entrance. Therefore, the flood protection barrier can continue to maintain a seal and be functional to protect the property from potential flooding.

The Tube T-connector shown in FIGS. 3a, 3b, 3c and 3d provides an additional air connection for inflating the inflatable seal 216. The advantages lie in offering a simple and effective backup option that allows a property-owner to use a standard known pump to inflate the seal when the in-built primary pumping system that is integrally formed in the flood protection barrier fails. The tube T-connector 250 ensures the seal of the flood barrier can continue to function without waiting for replacement parts i.e. a replacement seal and therefore, continuing to function to protect the property from potential flooding.

The tube T-connector serves as a functional improvement by providing a back-up feature adapted for inflating the inflatable seal of the flood protection barrier. The tube T-connector provides a secondary inflating mechanism for inflating the inflatable seal and ensures that the barrier's inflatable seal can be appropriate inflated, even when the main pumping system (i.e. The pumping system that is integrally formed in the flood protection barrier) is unavailable. This back-up or secondary inflation means is a significant advantage for preventing system failure by ensuring that the inflatable seal can be inflated by an alternative to the primary hand-operated pump that is integrally formed in the flood protection barrier and ensures continuous protection even during a flood emergency.

The tube T-connector will now be described in detail.

The tube T-connector is indicated generally by reference numeral 250 and is shown in FIGS. 3a, 3b, 3c and 3d and is adapted to be connectable to the inflatable seal. As can be seen from the accompanying drawings, the tube T-connector is configured to be attached with ease to the inflatable seal and is connectable to a standard pump to enable a user to operate the standard pump to inflate the inflatable seal, An inflatable seal 216 extends around the portions of the main body panel 212 and extension portions 214 that engage the doorway, as described above. The inflatable seal 216 is formed from an elasticated material in the form of a tube which is sealed at both ends and attaches to the extension portions 214 with clips, not shown but whose location is indicated with reference numeral 218. The seal 216 includes a valve 220 which receives air and retains it within the seal. An example of a suitable material for forming the seal 16 and valve 220 is a bicycle inner tube which is cut and sealed at either end. In the event of failure of the primary inflation means which comprises the pump with the handle 24 that is built into the main body panel 212, the tube T-connector 250 enable connection of a pump 222 which is commonly used to inflate bicycle tyres. Vertical reciprocal movement of the handle 224 pushes air into the seal 216 via the tube T-connector 250 which is adapted to be connected to the connecting tube 226 so that air can be pumped from the standard back-up pump 222 into the inflatable seal 216 via the connector 250.

The tube T-connector 250 is adapted to be in fluid connection with the inflatable seal 216 as a secondary means or as an alternative means of inflating the inflatable seal. The tube T-connector can be connected with the inflatable seal, and is adapted to be connected to a standard known pump which a user can operate to inflate the inflatable seal. The simplicity and ease of use of the tube T-connector allows users to quickly inflate the barrier 200 without needing specialised equipment.

Furthermore, the tube T-connector 250 is configured to ensure that it does not interfere with the primary system when the primary inflating system is functioning normally.

The tube T-connector 250 solves a key technical problem; in the event of a failure of the primary means for inflating the inflatable seal, which is integrally formed in the flood barrier users currently have to order replacement parts, which puts their property at risk of flooding while they wait for delivery of the replacement parts and then fitting the replacement part into their existing flood protection barrier or barriers. The tube T-connector 250 eliminates this risk by providing an immediate back-up solution, ensuring that the flood barrier remains operational during this period. This also enhances the reliability of the flood protection system of the present invention.

The flood protection barrier 200 of the present invention including the secondary inflation means comprising the tube T-connector 250 ensures continuous flood protection even if the main inflating system fails, adding a critical layer of safety for the client. This backup feature is a significant advantage, as it reduces the risk of property damage while waiting for repairs or replacements.

Thus, by enabling users to use a simple, easily accessible standard pump for inflating the inflatable seal, the improved flood protection barrier of the present invention reduces reliance on specialised equipment or replacement parts, which can be costly and time-consuming. This makes the flood barrier system of the present invention more user-friendly, cost-effective, and reliable.

Corner Piece/Corner Adaptor (FIGS. 4a, 4b, 4c-4g)

In an alternative embodiment of the improved flood protection barrier of the present invention, there is also provided, a corner piece (also referred to herein as a corner adaptor) that is adapted for use with the flood protection barrier and in particular, for use at the lower, ground level arcuate areas at the corners of the flood protection barrier. The corner piece or corner adaptor is preferably, formed of silicone rubber. Referring now to FIGS. 4a to 4g, the corner piece is indicated generally by reference numeral 400 adapted to be attachable to each arcuate corner area of the flood protection barrier at the ground level and can be easily attached or removed from the flood protection barrier, solving the problem of users potentially misapplying or omitting additional sealing components that can be used to provide an additional seal for added seal formation at corners of an entrance to a property.

The Corner Piece will now be described in detail. Referring now to the drawings, FIGS. 4a, 4b, 4c, The design and placement of the silicone rubber corner piece on the flood protection barrier will be described and how it can be removed from the flood protection barrier when not required for instance, in storage or to be replaced by a new corner adaptor 400.

The corner piece or corner adaptor 400 ensures that the flood protection barrier seals correctly without relying on the user to apply any additional component. This functional advantage adds to the ease of use and effectiveness of the improved flood protection barrier of the present invention.

The corner piece 400 is preferably formed of silicone rubber. The corner piece 400 is adapted to be attached to the barrier (10 or 200), by virtue of the specific design features that allows it to be easily removed or replaced if necessary, while maintaining a secure seal. In particular, the corner piece 400 comprises a housing 420 comprising a front panel wall 405, and two side walls 410, 411, as well as four resilient clips 401, 402, 403 and 404 adapted to abut and engage with the flood protection barrier so as to hold the corner piece or corner adaptor 400 in place on the flood protection barrier. The corner piece/corner adaptor 400 also includes an arcuate segment 470 which is configured to extend from a rear edge 480 of the corner adaptor 400 to a front panel wall 405 of the corner adaptor 400. This arcuate segment 470 is adapted to abut and engage with the corresponding shaped arcuate segment of the inflatable seal 16 when in use and the inflatable seal 16 inflated around the corner region of the flood protection barrier 10,200 when in use so as to form a seal between the arcuate section of the inflatable seal 16, 216 at the corner regions near the ground level area between the flood protection barrier and the adjacent walls defining an entrance to a property.

Previously, in some use situations, depending on the shape or malformations at or around a particular entrance to some buildings, a malleable butile material was required to be applied/inserted by a user to the region between the corner regions of the flood protection barrier at the ground level and the adjacent nearby wall of an entrance. Frequently, this malleable material would be incorrectly applied or omitted in use, thereby compromising the effectiveness of the flood barrier. The corner piece/corner adaptor 400 is adapted for use with the flood protection barrier of the present invention eliminates this risk, thereby enhancing product reliability.

Bracket—("Dam Jam" Bracket) FIGS. 5a, 5b, 5c

Referring now to FIGS. 5a to 5o, the Dam Jam wall bracket will be described in detail. The wall bracket is indicted generally by reference numeral 500 provides a novel solution to a previously complex problem—installing flood barriers where there is no structural reveal or jamb for achieving sealing between the structure of the building and the inflatable seal of the flood protection barrier. The wall bracket is provided in various embodiments to enable the flood protection barrier to be used with multiple entrance types including where there are no traditional concrete pillars and to address this technical problem, the improved flood barrier of the present invention comprise, in this preferred embodiment, a removable, easy-to-install bracket 500.

Functionally, the wall bracket provides the means by which the flood barrier can form a seal in awkward entrances where the walls may be unevenly formed or may have structural damage and smooth surface concrete pillars are not provides against which the inflatable seal, when inflated in use, could form a seal surface between the inflatable seal and the walls of the mouth of the entrance to the property. The bracket in this preferred embodiment ensures that a smooth surface around the mouth of the entrance can be created for the flood barrier so that the inflatable seal can abut against the bracket so form a sealing surface, but with far less time, labour, and cost that required to built or carry out construction work to repair structural elements of the wall or doorway walls themselves in order to be able to define a smooth wall surface against which the inflatable seal, can abut and press in order to achieve a sealing surface between the inflatable seal and the walls defining the mouth of the entrance to be protected. Aesthetically, the bracket offers a more attractive and non-permanent alternative, which can be easily removed and stored when not in use.

The bracket can be fixed to the wall using bolts indicated by reference numerals 501 to be fitted into apertures 502 in the panel 510 of the wall bracket. In some embodiments, the wall bracket 500 may also comprise a gasket 530 around the perimeter of the bracket 500.

The problem can arise in practice that there is a lack of a suitable surface for the flood barrier to seal against when there is no reveal or jamb in the doorway. Previously, this required building concrete pillars, which increased time, labour, and cost. The Dam Jam wall bracket eliminates the need for these pillars, offering a faster, more cost-effective, and more flexible solution.

The advantages of providing the bracket relate to installation time and cost efficiency. Thus the bracket reduces the need for heavy construction work and can be easily installed by the user, and provide a functionally effective seal barrier in use and the associated protection and economic benefit for users.

Operation of the flood barrier 10 and the monitoring system of the present invention will now be described. The barrier 10 is placed into a doorway with the extension panels 14-1 and 14-2 in the retracted position in which the extension panels 14-1 and 14-2 are retracted into the main panel 12. The ratchet handle 32 is set to an expand direction and is moved backwards and forwards so that the externally threaded bar 28 rotates acting on the internally threaded members 30 and pushes the extension panels 14-1 and 14-2 outwards until they engage and grip the internal surfaces of the doorway. The pump 22 is then used to inflate the seal 16 until a predetermined pressure has been reached in the seal to form an inflated seal 16 having a predetermined pressure. The pumping action also causes the rotation of the air turbine 40 which generates an electrical current which is directed to the battery 38 thereby adding charge. The sensor receives charge from the battery 38 and begins measuring the pressure in the seal 16. This sensor data is processed by the PCB 38 and transmitted to a server which further processes the data which then communicates with an application running on a computer device of the user. The pressure can be monitored using the application on the computer device and in the event that the pressure falls below a predetermined level an alarm process is activated by the application on the computer device. As well as including pressure data, the transmitted data can also include battery charge status data to alert the user of a risk that the battery is becoming so discharged that it will not be able to undertake the sensing and transmitting operations required.

In alternative embodiments, other mechanisms for providing charge to the battery 38 may be provided. A current generating device such as an alternator may be provided to convert the linear movement of the shaft of the pump handle

24 into an electrical current. By placing a wheel of an alternator in engagement with the shaft of the handle 24 of the pump 22 the vertical reciprocal movement of the handle results in rotation of the wheel of the alternator thereby generating a current to charge the battery. Similarly, in the main embodiment described above a pump 22 is used to deliver air into the seal 16 and to charge the battery 38 via the generation of charge in the air turbine 40. However, as an alternative to using the pump 22 a small cylinder of compressed gas, such as compressed carbon dioxide, can replace the pump as the source of gas to inflate the seal. If the output of the cylinder of compressed gas passes through the air turbine 40 this will also act to charge the battery 38. As previously described, an air line bypass can be used once the seal is fully inflated to continue the charging of the battery.

Flood Protection Barrier Monitoring and Control System—Detailed Description of the Preferred Embodiment The flood protection barrier monitoring and control system is designed for installation in residential and commercial properties to protect against flooding. The flood protection barrier monitoring and control system comprises an inflatable seal around the flood protection barrier as described above in the first aspect of the present invention, which is adapted to ensure a watertight seal by preventing water from seeping around the edges of the flood protection barrier. The flood protection barrier monitoring and control system also comprises an intelligent monitoring system that is configured to continuously monitor the pressure within the seal when inflated i.e. when in use. If the pressure falls below a predetermined threshold, an alert is sent to the property owner, who may reside at a remote location.

The flood protection barrier monitoring and control system uses GPS and GPRS technology to capture and transmit various environmental and positional data to a cloud-based platform. This data includes real-time readings of the seal pressure, barrier temperature, and precise GPS coordinates. The system also measures the barrier's angle to verify that it remains in an optimal vertical position. Data packets are transmitted periodically to the cloud, where they are stored and monitored for potential issues. The flood protection barrier monitoring and control system is powered by a series of specialized modules, including the ESP32 for Wi-Fi and Bluetooth connectivity, the Quectel M65 GSM/GPRS module for data transmission, and a pressure sensor capable of measuring up to 6 bars. An accelerometer and gyroscope ensure accurate positioning, while a GPS module provides precise location data. Additionally, a dynamo charging interface supports the power management module, allowing the flood protection barrier monitoring and control system to operate sustainably.

This integrated monitoring and alert system enhances the reliability of the flood barrier, ensuring that any issues are detected and communicated promptly, thereby maximizing the effectiveness of flood prevention in vulnerable locations.

System Architecture

The flood protection gate monitoring system (also referred to as "the system" hereafter) comprises a main microcontroller unit (MCU), which may be selected from the group consisting of ESP32 or ATSAMD21G18, connected to a variety of sensors for monitoring critical operational parameters of the gate. The MCU operates in a low-power deep sleep mode and wakes periodically to collect data from the sensors.

1. Pressure Monitoring: The system utilizes a pressure sensor with a range of 0-6 bar, connected to the analog input of the MCU. This sensor measures the air pressure used to inflate the gate's sidewalls, which form the seal against the door frame. Pressure data is periodically logged and transmitted to the cloud-based platform. If the pressure falls below a user-defined threshold (e.g., 2.0 bar), the system sends an alert to the cloud platform for notification to the user.

2. Temperature Monitoring: An LM75AIM temperature sensor, operating over an I2C bus, is employed to measure the ambient temperature around the gate. Temperature fluctuations may affect the air pressure within the gate, thus it is critical to monitor and log this parameter.

3. Gate Alignment Monitoring: The MPU6050 gyroscope/accelerometer sensor is used to measure the angle of the gate relative to the floor. The sensor provides data on the pitch and roll of the gate, which is used to ensure that the gate remains properly aligned (approximately 90 degrees) when deployed. If the angle deviates outside a predefined range (e.g., 80-100 degrees), an alert is generated.

4. Battery Monitoring: The system includes a battery monitoring circuit that measures the voltage and capacity of the gate's power source, typically 2×18650 lithium-ion batteries. The battery voltage is read through the MCU's analog input, and the data is transmitted along with other sensor readings. Should the battery voltage fall below a certain threshold (e.g., 3.2V), the system triggers an alert, notifying the user that the battery needs recharging or replacement.

5. Location Tracking: The system incorporates an ATGM336H GPS module, connected via UART to the MCU, which logs the geographic coordinates of the or each barrier. This is particularly useful for managing multiple barriers deployed across different locations. The GPS data is transmitted to the cloud during each wake cycle.

6. GSM/GPRS Communication: A Quectel M65 GSM/GPRS module is integrated into the system for data transmission to a cloud-based monitoring platform. The module communicates with the MCU via UART, and it is activated only during the data transmission phase to conserve battery power. The last six digits of the GSM module's IMEI are used as a unique identifier for each barrier, facilitating easy identification within the cloud platform.

Operation of the System

The system operates in two primary modes: Sleep Mode and Wake Mode. In Sleep Mode, the MCU enters deep sleep, drawing minimal current to conserve battery life. The system remains in sleep mode for the majority of the time, waking up at predefined intervals (e.g., every 12 hours) to collect sensor data and transmit it to the cloud.

Upon entering Wake Mode, the MCU powers up the sensors and communication module. It reads data from the pressure sensor, temperature sensor, gyroscope/accelerometer, and battery monitoring circuit, as well as the GPS coordinates from the GPS module. This data is compiled into a JSON packet, which is then transmitted via the Quectel M65 GSM module to the cloud.

The cloud-based platform logs the received data, providing real-time monitoring of all deployed flood barriers. Users can access this data through a graphical user interface (GUI) that displays the status of each barrier, including pressure, temperature, gate alignment, battery capacity, and location on a map. Users may also define custom alerts for parameters such as pressure and battery voltage, which trigger notifications via email or SMS when thresholds are breached.

Power Management

Power management is a key feature of the system, allowing the system to run for extended periods on battery power. Referring to FIG. 8, the system uses low-power techniques such as deep sleep mode for the MCU and complete shutdown of the GSM module during idle periods. The system's power consumption is carefully managed, with sleep mode consuming approximately 1.03 mA, while wake mode consumes approximately 414 mA during brief data collection and transmission periods. With two 18650 batteries (2600 mAh each), the system is designed to operate for approximately 99 days before requiring battery replacement or recharge, assuming two wake cycles per day.

1. System Overview

The flood protection barrier is adapted to provide a waterproof seal between door jams/walls of a standard-sized door or walls defining an entrance to a building by inflating the inflatable seal with air pressure. The system of the present invention comprises a combination of sensors and communication modules to monitor critical parameters such as air pressure, barrier orientation, temperature, battery capacity, and location. Each barrier has a unique ID, derived from the last 6 digits of the GSM module's IMEI code, which allows for remote identification and tracking via a cloud-based dashboard. The system of the present invention operates in low-power mode, waking up twice per day to transmit data to the cloud, where multiple barriers can be monitored, and notifications can be customized based on the condition of the seal and/or other physical aspects of the barrier.

2. System Components

The system comprises the following components:

Main MCU (ESP32 or ATSAMD21G18):

Role: The main controller for the system, managing sensor data collection, processing, power management, and communication.

Low-Power Sleep Mode: The system stays in sleep mode most of the time, waking up twice a day for a short period to perform data acquisition and transmission, significantly extending battery life.

Sensor Interfaces: The MCU interfaces with a variety of sensors, including a pressure sensor, temperature sensor, accelerometer, GPS module, and battery monitor.

Communication: It controls the Quectel M65 GSM module for data transmission.

Pressure Sensor (0-4 Bar Range):

Role: Monitors the air pressure in the sidewalls of the barrier to ensure the waterproof seal is maintained.

Data Logging: The pressure readings are logged and transmitted to the cloud during the system's wake-up periods.

Alerts: If the pressure drops below 2 bar, an alert will be sent via the cloud dashboard to notify the user that the barrier may be losing its seal.

MPU6050 (Gyroscope/Accelerometer):

Role: Measures the standing angle of the barrier relative to the floor to ensure it remains upright at around 90 degrees.

Data Logging: The tilt angle is monitored, and deviations from the expected upright position (80-100 degrees) can be used to detect if the barrier has shifted or been dislodged.

Alerts: Any significant tilt outside the expected range can trigger an alert indicating the improper positioning of the or each barrier.

LM75AIM (Temperature Sensor):

Role: Monitors the ambient temperature around the barrier, which could affect its components and the air pressure inside the sidewalls of the or each barrier.

Data Logging: The temperature readings are logged and sent to the cloud for continuous monitoring and analysis.

Battery Management (2×18650 Batteries, 2600 mAh each):

Role: Powers the entire system, including the sensors and communication modules.

Capacity Monitoring: The system monitors the battery's voltage and capacity to ensure the or each barrier remains operational.

Low Power Mode: To extend battery life, the system enters a low-power state when not actively transmitting or measuring.

Alerts: If the battery capacity drops below 40%, an alert will be sent to prompt battery replacement or recharging.

ATGM336H GPS Module:

Role: Captures the GPS coordinates of each barrier for remote monitoring and tracking, particularly useful when many barriers are deployed in different locations.

Data Logging: GPS data is logged with each transmission to provide an accurate location of the gate.

Energy Efficiency: The system may capture GPS coordinates less frequently to conserve battery power, only doing so during every third wake-up cycle, for example.

Quectel M65 (GSM/GPRS Module):

Role: Transmits data from the system to the cloud via GSM/GPRS. This includes the unique ID, pressure, temperature, battery voltage, tilt angle, and GPS coordinates.

Network Communication: The last six digits of the GSM IMEI code are used as a unique identifier for each barrier, allowing for easy identification in the cloud dashboard.

Fallbacks: If the GSM signal is poor or unavailable, data can be queued for later transmission when the signal improves.

EEPROM (Data Storage):

Role: Stores calibration data for the accelerometer and learned patterns (e.g., typical pressure or temperature ranges). This allows the system to adapt dynamically to environmental changes.

3. Operation steps and operation Flow:

1. Startup: Upon initial power-up, the MCU performs self-tests to verify the operation of the sensors and GSM module. It retrieves any stored calibration data from EEPROM and ensures that the system is ready for data acquisition.

2. Low Power Sleep Mode: After startup, the system enters a low-power state to conserve battery life. The MCU uses its low-power timer to wake up the system twice per day.

3. Wake-Up and Data Collection:

The MCU wakes the system up, powering the sensors and gathering data.

The pressure sensor measures the air pressure in the sidewalls of the barrier.

The MPU6050 checks the standing angle of each barrier.

The temperature sensor measures the ambient temperature.

The GPS module captures the location of each barrier.

The battery's voltage and capacity are also checked.

4. Data Transmission:

The system compiles the collected data into a JSON packet that includes the unique ID of each barrier (derived from the GSM IMEI), pressure, temperature, angle, GPS coordinates, and battery information.

The data is transmitted to the cloud using the Quectel M65 GSM module.

5. Sleep Mode Re-entry: After data transmission, the system re-enters sleep mode, waiting for the next wake-up cycle.

4. Cloud Dashboard and Monitoring

Cloud Integration: All transmitted data is stored in the cloud, where it can be visualized on a dashboard. The barriers can be tracked on a map, and parameters such as pressure, temperature, angle, and battery levels can be monitored in real-time.

Grouping and Tracking: Multiple barriers can be grouped by location or customer. For example, a single customer with five barriers can monitor them collectively on the dashboard.

Graphical Monitoring: Historical data for each parameter (pressure, temperature, angle, battery) can be graphed over time, allowing for trend analysis and predictive maintenance.

Custom Alerts: Customers can set up personalized notifications or alerts. If pressure drops below 2 bar, if the barrier tilts significantly, or if the battery falls below 40%, the cloud system will send a pre-configured notification (email, SMS, etc.) to the customer based on their preferences.

5. Unique Identification and Tracking

Each barrier has a unique identifier (based on the GSM IMEI), allowing easy tracking and differentiation in the system.

The GPS coordinates logged from each barrier provide location-based monitoring, so users can track all their deployed barriers on a Google Maps-like interface.

6. Power Management and Battery Life

The system operates on two 18650 batteries (2600 mAh each), with significant emphasis on power-saving features. The system only wakes up twice per day to log and transmit data, ensuring maximum battery life.

The GPS module and other components are only powered when necessary, with the system remaining in low-power mode most of the time.

Adaptive thresholds and alerts, based on learned data, further optimize operations, extending battery life and improving overall efficiency.

7. System Adaptability

The system comprises AI functions, such as adaptive thresholds, whereby the system of the present invention is configured to learn typical pressure or temperature patterns and adjusts the alert threshold based on historical data.

Pattern Recognition: The system of the present invention recognizes recurring data patterns (such as slow pressure drops) and can issue early warnings before reaching critical levels.

The system is configured to ensures that all flood barriers in a particular property or building are consistently monitored and that any deviations in pressure, angle, temperature, or battery performance are detected early and an alert is sent to the user/property owner/property care-taker via customizable alerts in the cloud dashboard. The system of the present invention is configured to be reliable, energy-efficient, and adaptable to customer needs.

System Communications and Measurements

1. Main MCU (ESP32 or ATSAMD21G18)

Purpose: The main controller, responsible for managing all modules, gathering data, and transmitting it to the cloud via the GSM module.

Communication Interfaces:

I2C: Used for temperature (LM75AIM) and accelerometer (MPU6050) communication.

ADC (Analog-to-Digital Converter): Used for reading the voltage from the pressure sensor and battery.

UART: Used for communication with the Quectel M65 GSM module.

GPS UART Interface: Communicates with the ATGM336H GPS module using a dedicated UART channel.

2. Pressure Sensor (0-4 Bar Range)

Purpose: Measures air pressure in the system.

Interface: Analog input (0-5V corresponding to 0-4 bar).

Code Description:

Read the analog value from the pressure sensor and convert it to bar pressure.

3. MPU6050 (Gyroscope/Accelerometer)

Purpose: Monitors the angle of the gate.

Interface: I2C communication.

Code Description:

Initialize the MPU6050, read the angle data, and calculate the pitch/roll relative to the floor.

The pitch and roll values are compared to the range of acceptable angles (80-100 degrees) to determine if the barrier is standing correctly.

4. LM75AIM (Temperature Sensor)

Purpose: Measures ambient temperature.

Interface: I2C communication.

Code Description:

Initialize the LM75AIM and read the temperature value via I2C.

5. Battery Monitoring

Purpose: Monitor the battery's voltage and capacity.

Interface: Analog input via the ADC pin to measure the voltage.

Code Description:

Use a voltage divider to scale the battery voltage and read it via an ADC pin.

6. ATGM336H (GPS Module)

Purpose: Provides the GPS location of the barrier.

Interface: UART communication.

Code Description:

Read GPS data over UART, parse the NMEA sentence to extract the latitude and longitude.

7. Quectel M65 (GSM/GPRS Module)

Purpose: Sends data to the cloud, transmits alerts, and uses the last 6 digits of its IMEI as the unique identifier for each barrier.

Interface: UART communication (AT commands).

Code Description:

Establish a connection to the GSM network, prepare the data packet, and transmit the data to a cloud server (Google Sheets or other platforms).

The unique identifier for each barrier is obtained by reading the IMEI of the GSM module using an AT command.

8. Data Transmission and Cloud Integration

The data gathered from all sensors (pressure, angle, temperature, battery voltage, GPS) is compiled into a JSON packet and transmitted to the cloud.

9. Cloud Dashboard and Monitoring

Cloud Dashboard: Receives the JSON packet, processes the data, and displays it on the user's dashboard. The customer can create custom notifications/alerts for any drop in pressure, battery level, or angle deviations.

Power Management Methodology

The power management strategy for the flood barrier system is crucial for maximizing battery life, as the system relies on 2×18650 batteries (2600 mAh each). The goal is to minimize power consumption during idle periods and wake the system only for brief moments to collect and transmit data.

1. Sleep Mode (Low Power Consumption)

MCU (ESP32 or ATSAMD21G18):

The microcontroller remains in deep sleep mode most of the time, reducing current consumption to a minimal level.

In this mode, all peripherals are turned off, and only the RTC (Real-Time Clock) or external interrupt (e.g., timer) wakes the system at set intervals.

Power Consumption in Sleep Mode:

ESP32: Typically ~10-20 µA.

ATSAMD21G18: Typically ~2 µA.

Quectel M65 GSM Module:

The GSM module is powered down completely during sleep mode to save energy, as it is one of the more power-hungry components when active.

Power Consumption in Sleep Mode: ~ 1 mA (when fully powered down).

Sensors (MPU6050, LM75AIM, Pressure Sensor):

Most sensors enter sleep or low-power mode during the MCU's deep sleep.

MPU6050: ~10 µA in sleep mode.

LM75AIM: ~1 µA in standby.

Pressure Sensor: No significant power draw as it's a passive analog sensor.

GPS Module (ATGM336H):

The GPS module is powered off during sleep mode as it is not required continuously and only activates for location logging during wake-up periods.

Power Consumption in Sleep Mode: ~100 µA (if in sleep mode) or fully off.

2. Wake-Up Mode (Data Collection and Transmission)

During wake-up periods (e.g., twice per day), the system powers up to collect sensor data, process it, and transmit it via the GSM module. This phase is short, typically lasting a few seconds to a couple of minutes, depending on the transmission speed and network conditions.

MCU Power Consumption in Wake Mode:

ESP32: ~240 mA (when active with Wi-Fi off).

ATSAMD21G18: ~5-12 mA.

Quectel M65 GSM Module:

During data transmission, the GSM module draws significantly higher current.

Power Consumption in Active Mode: ~100-200 mA during data transmission, depending on signal strength and GPRS usage.

Sensors:

MPU6050: ~3.6 mA when active (for a brief moment during the wake-up).

LM75AIM: ~70 µA when reading temperature.

Pressure Sensor: No active power consumption since it's passive and read by the MCU's ADC.

GPS Module:

Active power consumption occurs when acquiring the location.

Power Consumption: ~20 mA when acquiring GPS data.

3. Battery Life Calculation

The battery life can be estimated based on average current draw during sleep mode and wake-up mode, as well as the frequency and duration of wake-up events.

3.1 Sleep Mode Current Estimate:

ESP32 Sleep Mode: ~15 µA.

Quectel M65: ~1 mA.

Sensors (MPU6050, LM75AIM, etc.): ~11 µA.

Total Sleep Current: ~1.03 mA (assuming deep sleep mode and GSM fully powered down).

3.2 Wake Mode Current Estimate:

ESP32 Wake Mode: ~240 mA.

Quectel M65 (GSM transmission): ~150 mA.

Sensors (MPU6050, LM75AIM, Pressure Sensor, etc.): ~4 mA combined.

GPS Module: ~20 mA.

Total Wake Current: ~414 mA (for brief periods).

3.3 Wake Mode Duration:

Each wake-up cycle lasts approximately 2 minutes (120 seconds), including data collection and transmission.

Wake-up frequency is twice per day, so total wake time per day=240 seconds.

3.4 Daily Current Consumption Estimate:

Sleep Mode:

Sleep time per day=24 hours−(240 seconds wake time) =23.933 hours.

Sleep consumption=1.03 mA*23.933 hours≈24.65 mAh/day.

Wake Mode:

Wake time per day=240 seconds=0.067 hours.

Wake consumption=414 mA*0.067 hours≈27.74 mAh/day.

Total Daily Consumption:

Total current consumption per day=24.65 mAh (sleep)+27.74 mAh (wake)=52.39 mAh/day.

3.5 Battery Life Estimate:

Battery Capacity: 2×18650 batteries, 2600 mAh each=5200 mAh total.

Daily Consumption: ~52.39 mAh/day.

Battery Life Estimate:

Battery life=5200 mAh/52.39 mAh/day≈99.2 days (roughly 3 months).

4. Considerations for Power Optimization:

Wake-up frequency: Reducing the wake-up frequency (e.g., from twice to once per day) would nearly double battery life.

GPS polling: Acquiring GPS coordinates less frequently (e.g., every third wake-up) would reduce current consumption during wake-up.

Optimizing transmission time: Ensuring efficient data transmission (minimizing transmission retries and reducing data size) helps reduce wake-up duration.

Summary of Power Management

Sleep Mode: Minimizes power consumption to about 1.03 mA, ensuring long battery life.

Wake Mode: Brief but higher consumption periods (~414 mA) twice per day for sensor data collection and transmission.

Battery Life Estimate: Approximately 99 days with the current settings, assuming two wake-ups per day and efficient GSM transmission.

Optimization: Battery life could be extended by reducing wake-up frequency, optimizing transmission duration, and adjusting GPS polling intervals.

The system of the present invention and operation methodology ensures that the flood barrier system operates efficiently, with minimal power consumption during sleep and brief, high-power wake-up periods, providing extended battery life and reliable performance.

It will be appreciated by persons skilled in the art that the above embodiments have been described by way of example only and not in any limitative sense, and that various alterations and modifications are possible without departure from the scope of the protection which is defined by the appended claims.

The invention claimed is:

1. A flood protection barrier for use in an entrance to a property, the flood protection barrier comprising:

a body panel having an edge for engaging a portion of an entrance to a property;

an extension panel extending from said body panel and having an edge for engaging another portion of said entrance;

an inflatable seal extending around said the edge for engaging the portion of the entrance to the property and said edge for engaging another portion of said entrance of the extension panel;

said inflatable seal being adapted for inflation of the inflatable seal for forming a seal between the flood protection barrier and the entrance, when the flood protection barriers is in use;

means for inflating said inflatable seal with a fluid to form an inflated seal for forming a seal between the flood protection barrier and the entrance, when the flood protection barriers is in use;

a pressure sensor for sensing a pressure of said fluid in said inflated seal and generating pressure data; and a data transmitter for periodically transmitting said pressure data to a remote receiver associated with an alarm system for alerting a user to a drop in pressure in said inflatable seal below a predetermined level.

2. The flood protection barrier as claimed in claim 1 wherein the means for inflating said inflatable seal with the fluid comprises an inflation device.

3. The flood protection barrier as claimed in claim 2, wherein the inflation device comprises a hand-operated pump.

4. The flood protection barrier as claimed in claim 2, wherein the inflation device comprises a hand-operated pump that is integrally formed in the flood protection barrier to provide a primary inflation means.

5. The flood protection barrier as claimed in claim 1, wherein a second inflation device is provided to provide an alternative inflation means to the means for inflating, the second inflation device provides a secondary, back-up, inflation means for the primary inflation means in an event of failure of the inflation means.

6. The flood protection barrier as claimed in claim 1 wherein the fluid comprises a gas.

7. The flood protection barrier as claimed in claim 1, further comprising:

an electricity generator for generating electricity from an action of said inflation device and a battery for storing said electricity for powering said pressure sensor and said data transmitter.

8. The flood protection barrier according to claim 7, wherein said electricity is generated by an air turbine pneumatically connected to a pump.

9. The flood protection barrier according to claim 8, wherein said electricity is generated by a dynamo connected to a reciprocating member of said pump, said pump comprised of a hand-operated pump.

10. The flood protection barrier according to claim 1, wherein the extension panel is comprised of a pair of extension panels extending in opposite directions from said body panel.

11. The flood protection barrier according to claim 1, wherein said data transmitter transmits and logs a date and a time when said barrier is in use.

12. The flood protection barrier according to claim 1, further comprising:

an app downloadable onto a device, wherein said data transmitter transits to said device and said pressure data is stored on said app.

13. A system for monitoring and controlling the flood protection barrier as claimed in claim 1 using sensors to detect parameters, including air pressure in the inflatable seal, temperature, barrier alignment, and battery status.

14. The system as claimed in claim 13 comprising a microcontroller unit (MCU) configured for collecting data from the sensors and transmitting the collected data periodically to a cloud-based monitoring platform via a GSM/GPRS module.

15. The system as claimed in claim 13, wherein the system is configured to operate in a sleep mode and in a wake-mode whereby the system is configured to move from the sleep mode to the wake mode periodically and is configured to collect and transmit data in the wake mode.

16. The system of claim 13, further comprising:

an adaptive alerting mechanism that allows users to set customized thresholds for various parameters, such as air pressure and battery capacity; and the adaptive alerting mechanism configured to detect when the customized thresholds are breached, the system is configured to send notifications through a cloud platform, enabling remote monitoring and maintenance of the flood protection barrier.

17. The system as claimed in claim 13, further comprising:

the pressure sensor configured to measure air pressure in the inflatable seal of the flood protection barrier; and at least one of:

a temperature sensor configured to measure ambient temperature;

an accelerometer configured to measure an angle of the flood protection barrier relative to a floor;

a battery monitoring circuit configured to measure a voltage of a battery;

a GPS module configured to provide geographic coordinates of the flood protection barrier;

a microcontroller unit (MCU) operatively connected to the pressure sensor, and at least one of the temperature sensor, the accelerometer, the battery monitoring circuit, and the GPS module, said MCU being further configured to enter a low-power sleep mode and periodically wake to collect sensor data;

a GSM/GPRS module operatively connected to the MCU, configured to transmit the sensor data to a cloud-based platform; and a unique identifier derived from the GSM module's IMEI code for identifying the flood protection barrier within the cloud platform.

18. The system of claim 17, wherein the MCU is configured to compile the sensor data into a data packet formatted in JSON and transmit said data packet to the cloud-based platform.

19. The system of claim 17, further comprising:

a power management system configured to extend battery life by placing the microcontroller unit (MCU) into a deep sleep mode when the system is not actively collecting or transmitting data.

20. A kit of parts comprising the flood protection barrier of claim 1 and a T-connector adapted to connect with the means for inflating said inflatable seal, whereby the T-connector is connectable to a secondary pump for inflating the inflatable seal.

21. A kit of parts comprising the flood protection barrier of claim 1 and a corner adaptor, wherein the corner adaptor is configured to be removably engaged with the flood protection barrier to provide an additional seal in corner regions of the flood protection barrier, in use in the entrance to the property.

22. A kit of parts comprising the flood protection barrier of claim 1 and a wall bracket which is adapted to be connected, in use, to a wall at the entrance to the property and to provide a smooth surface at the wall for engaging with the inflatable seal of the flood protection barrier, when in use whereby the inflatable seal is inflated and forms a sealing surface when the inflated seal abuts against the wall bracket.

\* \* \* \* \*